United States Patent [19]

Warshawsky

[11] Patent Number: 4,492,488
[45] Date of Patent: Jan. 8, 1985

[54] LAMP SWIVEL

[75] Inventor: Jerome Warshawsky, Baldwin Harbor, N.Y.

[73] Assignee: I. W. Industries, Inc., Melville, N.Y.

[21] Appl. No.: 434,614

[22] Filed: Oct. 15, 1982

[51] Int. Cl.³ ............................................. F16C 11/00
[52] U.S. Cl. .................................. 403/113; 403/115; 403/117; 403/166; 403/134; 403/144; 285/DIG. 8; 285/264; 248/481; 248/288.3
[58] Field of Search ............... 403/115, 116, 117, 113, 403/166, 135, 133, 53, 134, 138, 144, 124; 285/DIG. 8, DIG. 18, 278, 279, 280, 282, 264; 29/237, 436, 437, 511; 248/481, 483, 482, 484, 288.3, 288.5

[56] References Cited

U.S. PATENT DOCUMENTS

| 1,694,626 | 12/1928 | Roberts | 29/437 |
| 2,298,176 | 10/1942 | Schwartz | 285/DIG. 8 X |
| 2,352,806 | 7/1944 | Schwartz | 285/DIG. 8 X |
| 2,362,100 | 11/1944 | Schwartz | 285/DIG. 8 X |
| 3,022,096 | 2/1962 | Schwartz | 403/116 X |
| 3,066,581 | 12/1962 | Goldbeck | 29/511 |
| 3,072,426 | 1/1963 | Gilbert | 403/115 |
| 3,209,216 | 9/1965 | Langridge et al. | 29/511 |
| 3,441,293 | 4/1969 | Bagnulo | 29/511 X |
| 3,525,448 | 8/1970 | Bauer | 403/76 X |
| 4,322,098 | 3/1982 | Warshawsky | 285/DIG. 8 X |

Primary Examiner—Cornelius J. Husar
Assistant Examiner—Joseph A. Fischetti
Attorney, Agent, or Firm—Stephen E. Feldman

[57] ABSTRACT

A substantially tubular housing houses a swivel unit proximate one of its ends and a tailpiece proximate the other of its ends; with a relatively strong spring disposed therebetween to urge each unit against its respective housing end with sufficient pressure to retain each such unit as selectively positioned. A swivel seat washer is disposed between the spring and swivel; while a pair of washers, one plastic and one brass, are disposed between the spring and tailpiece. The swivel unit includes an extension with external threads and flat sides that cooperate with flat sides of an opening in the housing end and through part of the sidewall of the housing; the flat sides of the extension and of the housing opening coacting to restrict rotation of the swivel to ninety degrees of rotation about a first axis of rotation. The tailpiece is disposed within the housing to rotate about a second axis of rotation and is formed with an enlarged end that is retained within the housing and a reduced end that extends out through the other end of the housing. The inner wall of the housing at said second end is counterbored to provide a clearance space between said enlarged tailpiece end and the inner wall of the housing but for less than the full coextensive length of the two. The shoulder formed in the inner wall at the end of the counterbore is champhered to minimize, if not eliminate, a pressure point between the tailpiece and housing at this location. Stop means are provided to restrict rotation of the tailpiece to almost, but less than 360°.

11 Claims, 5 Drawing Figures

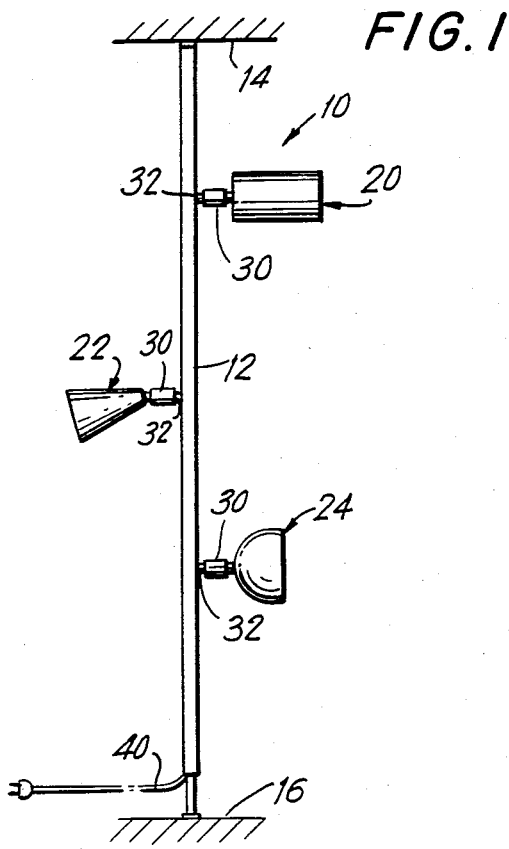
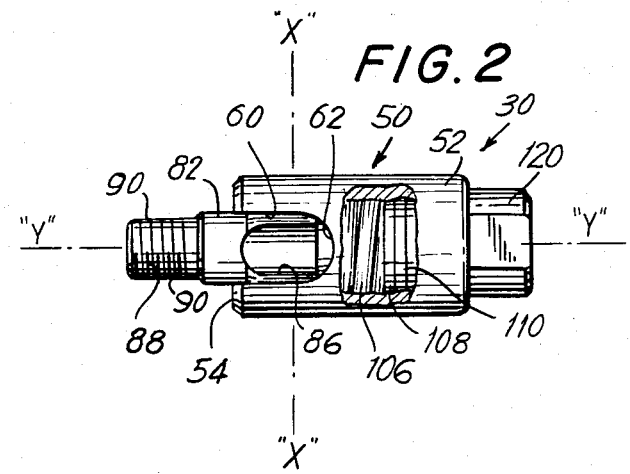
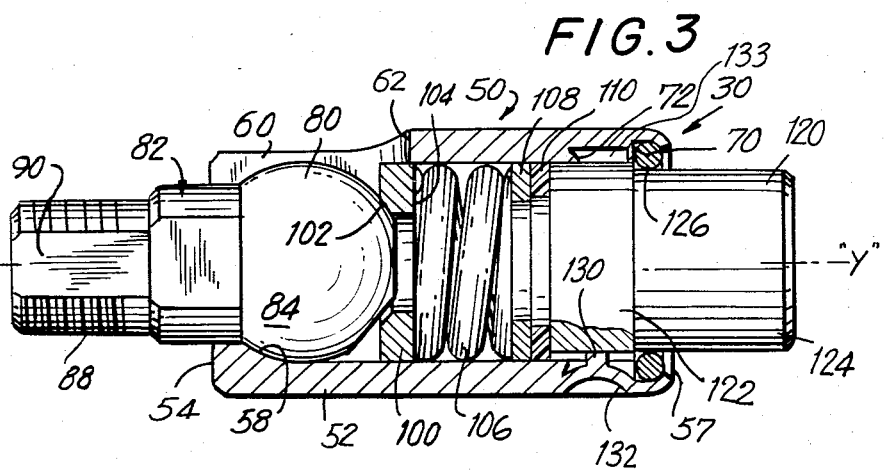
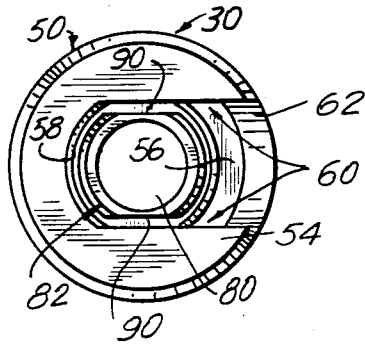
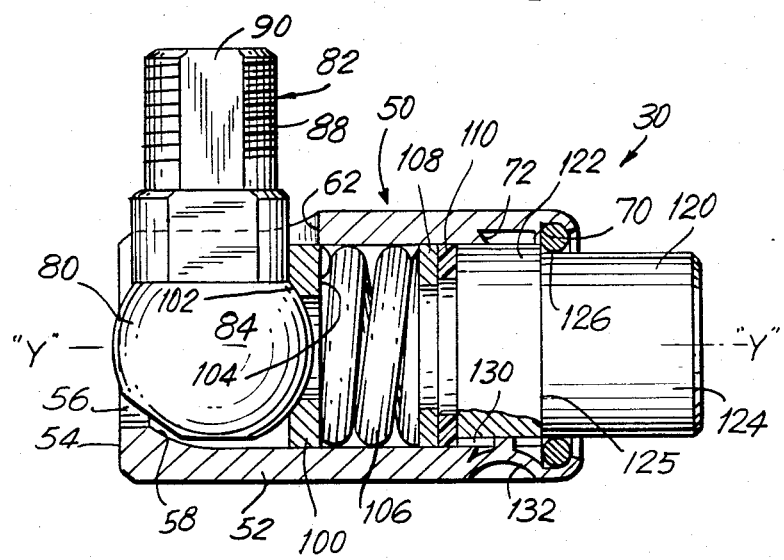

LAMP SWIVEL

BACKGROUND OF THE INVENTION

1. Field of Application

This invention relates to swivel assemblies; and more particularly to ninety-degree swivel assemblies for lamps.

2. Description of the Prior Art

The socket into which a light bulb is inserted must be, in turn, connected to a support post, column, or base of some kind to facilitate positioning the bulb, and whatever type shade device may be provided for the bulb, for its intended use. Quite often the connection between the socket and its support is fixed so that the bulb is supported in a vertical (up or down), horizontal or other suitable position.

Many lamps, such as pole lamps or lamps which support the light socket at the end of swing arms, or the like, utilize light sockets with attached bullet, cylindrical, or globe shaped shades. Such shade and socket combinations are also found in many styles of track lighting. For such lamps and lighting it is often desired to provide a connection, such as a swivel, which permits selective positioning of the light source to direct the light rays in a particular manner.

The available swivels for so connecting a light source to its support are, however, quite complex in construction. The more complex the construction, the greater the expense the swivel will add to the cost of the lamp. Additionally, complexity of construction often creates problems of use and wear which affect and maybe shorten the available life span of the lamp.

Some existing swivel assemblies provide for rotation of the light socket (and its connected shade device) in a manner similar to a ball and socket connection. Other swivels provide for rotation of the light socket around an axis of rotation passing through the swivel; as well as rotation about a second axis of rotation which intersects and is perpendicular to the first axis of rotation. This later type of swivel sometimes limits the rotation about the second axis of rotation to a given range such as ninety degrees. However many of these later type swivels are very complex in construction and present unwanted problems of wear, use and cost.

SUMMARY OF THE INVENTION

It is therefore an object of this invention to provide a new and improved swivel.

It is another object of this invention to provide a new and improved swivel for connecting a light socket to its support member.

It is yet another object of this invention to provide a new and improved swivel for lamp lighting units and lighting equipment.

It is still another object of this invention to provide a new and improved swivel which connects two members together.

It is yet still another object of this invention to provide a new and improved ninety-degree swivel.

It is yet still a further object of this invention to provide a new and improved ninety-degree swivel for connecting light sockets to their supports.

It is yet still a further object of this invention to provide a new and improved ninety-degree swivel for lamps, lighting fixtures and lighting equipment.

This invention involves a ninety-degree swivel for connecting the light bulb receiving socket to a suitable support member for a lamp or lighting unit, and contemplates forming the body of the swivel in such a manner that binding of the tailpiece of the swivel through which the swivel is connected to its support member, or of other associated parts is substantially reduced if not fully eliminated.

Other objects, features, and advantages of the invention in its details of construction and arrangement of parts will be seen from the above, from the following description of the preferred embodiment when considered with the drawing and from the appended claims.

BRIEF DESCRIPTION OF THE DRAWING

In the drawing:

FIG. 1 is a schematic view of a pole lamp incorporating the instant invention;

FIG. 2 is a plan view of the swivel assembly utilized to connect the lamp unit to the support member for the lamp of FIG. 1, cut away in part to show details thereof;

FIG. 3 is a side elevation view of the swivel of FIG. 2 enlarged and with the housing and some members shown in vertical section and other members cut away in part to better show details thereof, where said sectional view is taken along the plane of the paper.

FIG. 4 is an end view of the swivel assembly of FIGS. 3 and 4; and

FIG. 5 where said sectional view is taken along the plane of the paper, is a side elevation view of the swivel of FIG. 3 with its spherical swivel member rotated through ninety degrees.

DESCRIPTION OF THE PREFERRED EMBODIMENT

For convenience the invention will be described as applied to a pole lamp mounting three light sockets each with a different shaped shade device. It should be understood, nevertheless, that without departing from the scope of this invention: that the support member can be a base mounted support for a floor, desk or table lamp, or track members for track lighting; that such support can mount one, two or any convenient number of light sources; that such light sources may or may not include light shade devices; and that the light source devices on any particular support can include all similar shade devices or any combination of similar and different shade devices.

With reference to FIG. 1, there is generally shown at 10 a lamp, in the form of a pole lamp having a support pole 12 disposed, in a conventional manner, between an upper surface member such as a ceiling 14, and a lower surface member such as a floor 16. Three lamp or lighting units 20, 22, and 24 are mounted to support pole 12 by being connected to swivel assemblies 30 which are, in turn, connected to connecting members 32, of conventional construction and conventionally secured to support pole 12.

An electrical conductor wire 40, having a male plug at one end for connection to a suitable source of electricity, extends up into support pole 12 and is conventionally connected to other conductor wires (not shown) which extend through connecting members 32, swivel assemblies 30, and to the light sockets (not shown) of lamp units 20, 22 and 24. All swivel assemblies 30 are identical in construction and operation so only one such swivel assembly will be hereinafter described.

The components of swivel assembly 30 are encased in a swivel housing 50 (FIGS. 1–5) of substantially tubular construction and having a wall 52 of substantially uniform thickness. A first end 54 (FIGS. 3 and 4) of housing 50 is partially closed, but so as to provide an opening 56 with a curved inner wall 58 (FIG. 4) and opposed straight, parallel and flat side walls 60. Opening 56 extends through the tubular side wall 52 of housing 50 with side walls 60 of opening 52 extending through wall 52 and terminating at a curved end wall 62. The other, or second end 66 of housing 50 is counterbored to provide a first annular internal shoulder 70 (FIGS. 3 and 4) and a second annular internal shoulder 72 which is champhered as shown in a direction into the material of wall 52 of housing 50.

A swivel 80 is housed within housing 50 at first end 54 thereof so that an extension piece 82 of swivel 80 extends out through opening 56, and a ball portion 84 thereof is retained within housing 50 proximate end 54. The inner wall of end 54 is curved to accommodate ball portion 84 which is formed with outside walls that are portions of a sphere and with an opening 86 formed therein to accommodate conductor wire 40. Outer surface 88 of extension 82 is threaded to facilitate attachment of a lamp unit, such as lamp unit 20, thereto; and has flats 90 formed on each side thereof that are only slightly spaced from side walls 60 of opening 56. As such swivel 80 can rotate within housing 50 about an axis X (FIG. 2) between a position where extension 82 lies adjacent curved inner wall 58 and a position where extension 82 lies adjacent curved end wall 62. The angle traveled by swivel 80 is ninety degrees. The flats 90 coact with sides 60 of opening 56 to prevent rotation of swivel 80 within housing 50 except about axis "X". Instead, should any force be applied to extension 82 of swivel 80 to rotate same, other than in a direction about axis X and within opening 56, the force so applied will effect a rotation of housing 50 and swivel 80 together as will be hereinafter described.

A swivel seat washer 100 is disposed within housing 50 so that a dished seat side 102 thereof is disposed adjacent swivel ball 84 and with a flat side 104 thereof disposed against a spring 106. Spring 106 is fabricated from relatively heavy stock so as to exert a strong force against swivel 80 to maintain same as selectively positioned. Washer 100 may be made from brass or any other suitable material.

The other end of spring 106 is positioned against a spacer 108 also in the form of a brass washer which is in turn disposed next to an end washer 110 formed from a suitable plastic such as Delrin.

A tailpiece 120 is disposed within housing 50 with an enlarged end 122 thereof positioned against end washer 110, and with a reduced end 124 thereof extending out from end 66 of housing 50. A shoulder 125 formed on tailpiece 120 where enlarged end 122 thereof meets reduced end 124 cooperates with a retention washer 126 to retain all the components within housing 50. Retention washer 126 is maintained in position by peening over the extreme end portion of housing 50 proximate first counterbore 70.

It should be noted that the counterbored area 128 of the inner wall portion 133 of housing 50 between shoulders 70 and 72 is of enlarged diameter with respect to the remaining internal diameter of housing 50 and extends for most of the length of enlarged end 122 of tailpiece 120; and that the champhered shoulder 72 is formed at the innermost end of the this counterbore. As such there is provided a space between the inner surface of reduced diameter portion 128 of the inner wall of housing 50 and the corresponding outer surface of enlarged end 122 of tailpiece 120. The enlarged diameter portion of the inner wall of housing 50 beginning at shoulder 72, however, is disposed in closer proximity to the relatively small remaining outer surface of enlarged end 122 of tailpiece 120 and in conjunction with retention washer 126 serves to guide the rotation of tailpiece 120 in housing 50. By so reducing the areas of close proximity between the inner surface of housing 50 and the outer surface of end 122 of tailpiece 120 pressure points between shoulder 72 of housing 50 and the outer surface of tailpiece 120 are minimized if not fully eliminated.

Tailpiece 120 is disposed within housing 50 so as to be rotatable within housing 50 about an axis of rotation "Y" (FIGS. 3 and 5) which intersects and is disposed at ninety degrees with respect to axis of rotation "X". However, a stop 130 is formed on tailpiece 120 for coaction with a stop 132 extending inwardly from wall 52 of housing 50 to limit rotation of tailpiece 120 to almost but not more than 360°. Tailpiece 120 is otherwise tubular in configuration with internal threads formed within reduced end 124 thereof.

Swivel assembly 30 is placed in use by threading reduced diameter end 124 thereof onto a suitable connector of the lamp support. A lamp unit, such as lamp unit 20, is threaded onto the threaded end of extension 82. Once so assembled the lamp unit can be rotated about axis of rotation "Y" through almost 360° and can be swiveled through ninety degrees by rotating housing 50 about swivel 80.

From the above description it will thus be seen that there has been provided a ninety-degree lamp swivel which is relatively simple in construction while being constructed to minimize if not fully eliminate binding of the rotating parts and subsequent failure of the swivel to operate.

It is understood that although I have shown the preferred form of my invention that various modifications may be made in the details thereof without departing from the spirit as comprehended by the following claims.

In addition, it thus will be seen that there is provided a lamp swivel which achieves the various objects of the invention, and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention. Other embodiments, forms, and modifications of the invention, coming within the proper scope and spirit of the appended claims, will of course readily suggest themselves to those skilled in the art. Thus, while there has been described what is at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

I claim:

1. A swivel assembly for a lamp; comprising:
   (a) a swivel housing having a body portion of substantially tubular configuration and of first predetermined length and having a first end and a second end;
   (b) a swivel unit disposed within said housing proximate said first end thereof, said swivel unit and said first end of said housing being respectively formed to permit rotation of said swivel unit with respect to said housing about a first predetermined axis of rotation and through a first predetermined angle of rotation;
   (c) a tailpiece unit disposed within said housing at said second end, said swivel housing and said tailpiece unit being respectively formed to permit rotation of said housing with respect to said tailpiece unit about a second predetermined axis of rotation;
   (d) spring means located between said swivel unit and said tailpiece unit to urge each unit against its respective end of said housing; and
   (e) said tailpiece unit having a predetermined configuration and including an outer surface at least a portion of which is of a predetermined outer diameter for a first predetermined length of said tailpiece unit;
   (f) said swivel housing including a first inner wall portion of a first predetermined internal diameter and of a second predetermined length, and a second inner wall portion adjacent said first inner wall portion of an enlarged internal diameter, in comparison with said first predetermined internal diameter of said swivel housing, and of a third predetermined length;
   (g) said tailpiece unit being disposed within said swivel housing so that a first section of said first predetermined length of said tailpiece unit is disposed for coaction with at least a portion of said first inner wall portion of said swivel housing and a second section of said first predetermined length of said tailpiece unit is disposed to be concentric with and spaced from said second inner wall portion of said swivel housing;
   (h) said second inner wall portion of said swivel housing meeting said first inner wall portion of said housing at a shoulder.

2. The swivel assembly of claim 1 wherein said shoulder is champhered in a direction away from said tailpiece and towards the said second inner wall of said housing.

3. The swivel assembly of claim 1 wherein said first axis of rotation and said second axis of rotation intersect at an angle of ninety degrees, and said swivel unit rotates about said first axis of rotation through an angle of ninety degrees.

4. The swivel assembly of claim 2 wherein said housing is formed with an opening at said first end and said swivel unit is formed with an extension which protrudes through said opening.

5. The swivel assembly of claim 4 wherein said opening at said first end of said housing has flat sides and extends from said first end of said housing through a portion of the wall of said housing, and said swivel extension is formed with flat sides to cooperate with said flat sides of said housing opening to prevent rotation of said swivel within said housing except about said first axis of rotation.

6. The swivel assembly of claim 5 wherein said tailpiece unit includes an enlarged end disposed within said housing and a reduced end which extends out from said second end of said housing.

7. The swivel assembly of claim 6 wherein said housing is formed with a piece extending inwardly towards said tailpiece unit and said tailpiece unit is formed with a stop disposed for cooperation with said inwardly extending housing piece to cooperate therewith and prevent rotation of said housing, with respect to said tailpiece unit, through 360°.

8. The swivel assembly of claim 7 wherein said spring means includes a spring housed between a first washer means disposed for cooperation with said swivel unit and a second washer means disposed for cooperation with said tailpiece.

9. The swivel assembly of claim 8 wherein said second washer means includes a brass washer disposed adjacent said spring and a plastic washer disposed adjacent said tailpiece and said brass washer.

10. The swivel assembly of claim 9 wherein a retention washer is disposed proximate said second end of said housing to retain said tailpiece unit in position within said housing.

11. The swivel assembly of claim 10 wherein said housing is peened over at said second end to retain said retention washer in position within said housing.

* * * * *